US006871224B1

(12) United States Patent
Chu et al.

(10) Patent No.: US 6,871,224 B1
(45) Date of Patent: Mar. 22, 2005

(54) FACILITY TO TRANSMIT NETWORK MANAGEMENT DATA TO AN UMBRELLA MANAGEMENT SYSTEM

(75) Inventors: Jie Chu, Los Altos, CA (US); Sampath Kumar Sthothra Bhasham, Santa Clara, CA (US); Aravind Sitaraman, Santa Clara, CA (US); Leslie Alan Thomas, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 42 days.

(21) Appl. No.: 09/225,262

(22) Filed: Jan. 4, 1999

(51) Int. Cl.[7] .............................................. G06F 15/173

(52) U.S. Cl. ........................ 709/224; 709/223; 709/226

(58) Field of Search ........................... 370/244; 707/10; 709/203, 223, 224, 226

(56) References Cited

U.S. PATENT DOCUMENTS

| | | | | |
|---|---|---|---|---|
| 4,999,763 | A | 3/1991 | Ousborne | 364/140 |
| 5,109,486 | A | 4/1992 | Seymour | 395/200 |
| 5,241,594 | A | 8/1993 | Kung | 380/4 |
| 5,276,801 | A | 1/1994 | Heyen et al. | 395/162 |
| 5,283,783 | A | 2/1994 | Nguyen et al. | 370/16.1 |
| 5,287,103 | A | 2/1994 | Kasprzyk et al. | 340/825.52 |
| 5,361,250 | A | 11/1994 | Nguyen et al. | 370/16.1 |
| 5,367,635 | A | 11/1994 | Bauer et al. | |

(List continued on next page.)

FOREIGN PATENT DOCUMENTS

| | | | | |
|---|---|---|---|---|
| WO | 97/13352 | 4/1997 | ............ | H04M/3/50 |
| WO | 97/13382 | 4/1997 | ............ | H04Q/7/22 |
| WO | 99/53408 | 10/1999 | ........... | G06F/15/16 |

OTHER PUBLICATIONS

Li Ting Kwok, Telecommunication Management Network—Management Services (TMN–MS), Surveys and Presentations in Information Systems Engineering (SURPRISE 1997), 8 pages.*
D. Artiges et al., TMN Based Accounting Management Architecture, IEEE, 1996, 6 pages.*
Carrel, D. et al., The TACACS+ Protocol, Version 1.78, Cisco Systems, Inc., printed from ftp://ftp–eng.cisco.com/edweber/tac–rfc.1.78.txt on Oct. 23, 2000.
Active Software, Inc., "Active Software's Integration System", printed from http://www.activesw.com/products/products.html, on Jul. 24, 1998.
Cisco Systems, Inc., "CiscoDNS/DHCP Manager V.1.1", printed from http://www.combinet.com/warp/public/751/dnsmg/dnsmg_ds.htm, on Sep. 10, 1998, 4 pages.

(List continued on next page.)

*Primary Examiner*—Patrice Winder
(74) *Attorney, Agent, or Firm*—Thelen Reid & Priest LLP; David B. Ritchie

(57) ABSTRACT

A method for conveying data communications network management information to an umbrella management system whereby network management information events are published on an information bus and received at a subscribing monitor interface located on the information bus. The monitor interface then converts the network management information events into umbrella management system-useable information and communicates the umbrella management useable information to the umbrella management system. In this manner, the umbrella management system is able to import valuable information pertaining to the devices and services that comprise the overall network. The monitor interface includes an adapter located on the information bus that subscribes to network management information events, a converter that formats the network management information events into data useable by the umbrella management system, and a forwarder that communicates the umbrella management system-useable data to the umbrella management system.

16 Claims, 5 Drawing Sheets

U.S. PATENT DOCUMENTS

| | | | |
|---|---|---|---|
| 5,442,791 A | 8/1995 | Wrabetz et al. ............. 709/203 |
| 5,491,791 A | 2/1996 | Glowny et al. ......... 395/183.13 |
| 5,555,244 A | 9/1996 | Gupta et al. ................ 370/60.1 |
| 5,561,703 A | 10/1996 | Arledge et al. |
| 5,561,769 A | 10/1996 | Kumar et al. .......... 395/200.05 |
| 5,570,361 A | 10/1996 | Norizuki et al. ........... 370/60.1 |
| 5,581,478 A | 12/1996 | Cruse et al. ................. 364/505 |
| 5,592,538 A | 1/1997 | Kosowsky et al. ............ 379/93 |
| 5,610,910 A | 3/1997 | Focsaneanu et al. ........ 370/351 |
| 5,621,721 A | 4/1997 | Vatuone ....................... 370/16 |
| 5,655,077 A | 8/1997 | Jones et al. ............ 395/187.01 |
| 5,671,354 A | 9/1997 | Ito et al. |
| 5,673,265 A | 9/1997 | Gupta et al. ................. 370/432 |
| 5,678,006 A | 10/1997 | Valizadeh et al. |
| 5,684,950 A | 11/1997 | Dare et al. ............. 395/187.01 |
| 5,694,547 A | 12/1997 | Subramanian et al. ...... 709/224 |
| 5,699,521 A | 12/1997 | Iizuka et al. ........... 395/200.15 |
| 5,715,394 A | 2/1998 | Jabs |
| 5,717,604 A | 2/1998 | Wiggins et al. |
| 5,729,546 A | 3/1998 | Gupta et al. ................. 370/434 |
| 5,740,176 A | 4/1998 | Gupta et al. ................. 370/440 |
| 5,745,556 A | 4/1998 | Ronen ......................... 379/127 |
| 5,748,882 A | 5/1998 | Huang .................... 395/184.01 |
| 5,751,966 A | 5/1998 | Dauerer et al. ......... 395/200.54 |
| 5,764,736 A | 6/1998 | Shachar et al. .......... 379/93.09 |
| 5,764,756 A | 6/1998 | Onweller .................... 379/242 |
| 5,768,521 A | 6/1998 | Dedrick |
| 5,778,182 A | 7/1998 | Cathey et al. |
| 5,787,253 A | 7/1998 | McCreery et al. ..... 395/200.61 |
| 5,799,017 A | 8/1998 | Gupta et al. ................. 370/419 |
| 5,812,529 A | 9/1998 | Czarnik et al. ............. 370/245 |
| 5,812,750 A | 9/1998 | Deb et al. .............. 395/182.02 |
| 5,815,665 A | 9/1998 | Teper et al. ........... 395/200.59 |
| 5,835,727 A | 11/1998 | Wong et al. |
| 5,838,682 A | 11/1998 | Dekelbaum et al. ........ 370/401 |
| 5,838,683 A | 11/1998 | Corley et al. ............... 370/408 |
| 5,852,812 A | 12/1998 | Reeder ......................... 705/39 |
| 5,857,074 A | 1/1999 | Johnson ................. 395/200.47 |
| 5,862,404 A | 1/1999 | Onaga ......................... 395/828 |
| 5,867,495 A | 2/1999 | Elliott et al. ................. 370/352 |
| 5,873,084 A * | 2/1999 | Bracho et al. ................ 707/10 |
| 5,889,774 A | 3/1999 | Mirashrafi et al. .......... 370/352 |
| 5,898,780 A | 4/1999 | Liu et al. ....................... 380/25 |
| 5,905,715 A * | 5/1999 | Azarmi et al. ............... 370/244 |
| 5,905,736 A | 5/1999 | Ronen et al. ................ 370/546 |
| 5,913,037 A | 6/1999 | Spofford et al. |
| 5,922,051 A | 7/1999 | Sidey .......................... 209/223 |
| 5,926,463 A | 7/1999 | Ahearn et al. ............... 370/254 |
| 5,944,824 A | 8/1999 | He .............................. 713/201 |
| 5,968,116 A | 10/1999 | Day, II et al. ............... 709/202 |
| 5,970,477 A | 10/1999 | Roden ......................... 705/32 |
| 5,987,232 A | 11/1999 | Tabuki .................. 395/187.01 |
| 5,991,806 A * | 11/1999 | McHann, Jr. ................ 709/224 |
| 5,991,810 A | 11/1999 | Shapiro et al. .............. 709/229 |
| 5,991,828 A | 11/1999 | Horie et al. .................... 710/8 |
| 6,003,078 A | 12/1999 | Kodimer et al. ............. 709/224 |
| 6,009,103 A | 12/1999 | Woundy ..................... 370/401 |
| 6,011,910 A | 1/2000 | Chau et al. |
| 6,018,619 A | 1/2000 | Allard et al. |
| 6,021,262 A | 2/2000 | Cote et al. ............. 395/185.01 |
| 6,021,429 A | 2/2000 | Danknick ................... 709/208 |
| 6,021,496 A | 2/2000 | Dutcher et al. ............. 713/202 |
| 6,023,507 A | 2/2000 | Wookey ...................... 380/21 |
| 6,023,724 A | 2/2000 | Bhatia et al. ................ 709/218 |
| 6,026,087 A | 2/2000 | Mirashrafi et al. .......... 370/389 |
| 6,026,440 A | 2/2000 | Shrader et al. ............. 709/208 |
| 6,026,441 A | 2/2000 | Ronen ......................... 709/227 |
| 6,035,281 A | 3/2000 | Crosskey et al. ............. 705/14 |
| 6,047,376 A | 4/2000 | Hosoe ........................ 713/201 |
| 6,091,951 A | 7/2000 | Sturniolo et al. ........... 455/432 |
| 6,092,196 A | 7/2000 | Reiche ........................ 713/200 |
| 6,094,681 A | 7/2000 | Shaffer et al. ............... 709/224 |
| 6,098,116 A | 8/2000 | Nixon et al. .................... 710/8 |
| 6,105,061 A | 8/2000 | Nakai ......................... 709/223 |
| 6,119,160 A | 9/2000 | Zhang et al. ................ 709/224 |
| 6,125,390 A * | 9/2000 | Touboul ...................... 709/223 |
| 6,131,118 A * | 10/2000 | Stupek, Jr. et al. ......... 709/223 |
| 6,148,338 A * | 11/2000 | Lachelt et al. .............. 709/224 |
| 6,148,410 A | 11/2000 | Baskey et al. ................. 714/4 |
| 6,167,358 A | 12/2000 | Othmer et al. .............. 702/188 |
| 6,185,600 B1 * | 2/2001 | Spence et al. .............. 709/203 |
| 6,185,613 B1 * | 2/2001 | Lawson et al. ............. 709/224 |
| 6,192,034 B1 | 2/2001 | Hsieh et al. ................. 370/241 |
| 6,212,175 B1 | 4/2001 | Harsch ........................ 370/338 |
| 6,226,679 B1 | 5/2001 | Gupta ......................... 709/230 |
| 6,272,537 B1 | 8/2001 | Kekic et al. ................ 709/223 |
| 6,282,175 B1 | 8/2001 | Steele et al. ................. 370/254 |

OTHER PUBLICATIONS

Cisco Systems, Inc., "Cisco DNS/DHCP Manager V.1.1", printed from http://www.combinet.com/warp/public/751/dnsmg/dnsmg_pa.htm, on Sep. 10, 1998, 7 pages.

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

Cisco Systems, Inc., "Cisco DNS/DHCP Manager", printed from http://mwrns.noaa.gov/cisco/cc/td/doc/resprdct/res31.htm, on Sep. 10, 1998, 4 pages.

IBM, "IBM introduces new subscriber management system for Internet service providers", Dec. 2, 1998, IBM News, p. 1.

Network Registrar, "Hot Products & Solutions—IP Address Management: A White Paper", American Internet Corporation, Bedford, MA, printed from http://www.american.com/ip-mgmt.html, on Jul. 24, 1998.

Rigney, et al., "Remote Authentication Dial In User Service (RADIUS)", Network Working Group, RFC 2138, Apr. 1997, pp. 1–57.

* cited by examiner

FACILITY TO TRANSMIT NETWORK MANAGEMENT DATA TO AN UMBRELLA MANAGEMENT SYSTEM

BACKGROUND OF THE INVENTION

1. Field of the Invention

The present invention relates to a method and apparatus for managing and maintaining a data communications network. More particularly, the present invention relates to a method and apparatus for conveying network management data that is communicated via an information bus to an existing umbrella management system.

2. The Background

The ability to provide data communications networking capabilities to the personal user and the professional community is typically provided by telephone companies (Telcos) or commercial Internet Service Providers (ISPs) who operate network access points along the information superhighway. Network access points which are commonly referred to as Points of Presence or PoPs are located within wide area networks (WANs) and serve to house the network interfaces and service components necessary to provide routing, bridging and other essential networking functions. It is through these network access points that many users are able to connect with public domains, such as the Internet and private domains, such as the user's employer's intranet.

As a way of implementing comprehensive networks within an ISP or Telco these service providers have traditionally used a composite umbrella management system to monitor devices and applications. Such systems have been successful in networking the numerous functional operations required by a service provider. FIG. 1 illustrates an example of an umbrella management system 10 implemented by a Telco. In most Telco applications, the umbrella management system 10 shown in FIG. 1 manages a standard Public Switched Telephone Network (PSTN). The use of PSTNs within Telcos is well known by those of ordinary skill in the art and PSTNs have been the standard within the telephone communication industry for decades. In this example the umbrella management system 10 is capable of monitoring various operations that are performed by a Telco. OpenView™ from Hewlett Packard of Cupertino, Calif. is one example of such an umbrella management system. Many Telcos have also developed in-house proprietary systems for umbrella management. For example, the umbrella management system 10 is capable of providing a network for accounting maintenance 12, rating schemes 14, customer billing 16, customer credit checks 18, customer account verification 20, and customer care 22. Additionally, the umbrella management system 10 has the capability to communicate with another network 24 and a network management application 26. Information is able to flow to and from the various entities that comprise the comprehensive umbrella management system 10. For example, customer billing 16 is able to benefit from information provided to it by accounting maintenance 12 and/or rating schemes 14. The umbrella management system 10 uses various routers, switches, bridges and other network interface devices to accomplish the overall network scheme.

While umbrella management systems, such as the one shown in FIG. 1, have shown over the years to be extremely useful, they have in some cases also proven to be outdated and complex systems that do not lend themselves to ease of adaptability to other network systems. The large complex nature of these systems has made it nearly impossible for the users of such systems to consider overhauling or replacing such systems. These systems have evolved over time and many resources, financial and otherwise, have gone into structuring such systems. The users of such umbrella management systems are in many cases unwilling to bear the financial burden that would be encountered if such systems were to be replaced.

In many instances, the umbrella management system used by one company will be drastically different in form from that of another company, yet ultimately provide the similar function and features. The differences in systems is attributed to the systems being, for the most part, constructed piece-meal, over long periods of time and predominately built in-house. Additionally, the umbrella management systems, also commonly referred to as legacy or heritage systems, use products that are obsolete or very heterogenous in nature. Many in-house developed umbrella management systems use outdated programming codes that have shown to be difficult to update. In most instances the programming codes have been written in-house and the ability to update these codes or to make them work with other codes is very limited. These outdated programming languages have exhibited undocumented dependencies, non-decomposable architectures and duplicative functionality.

The network service providers that implement umbrella management systems are confronted with the problem of integrating new and improved data communications networking systems into the umbrella management system environment. The complexity and hierarchy built in to the umbrella management systems have in the past made it very difficult for interfaces to be constructed that will allow for seamless, simplified entry into the umbrella management system environment. Additionally, the users of such umbrella management systems are not willing to invest in interfaces that may involve long-term code maintenance. Thus, a desired interface will be generic in nature; capable of capturing information from another data communications network, filtering the information so that only desired information is forwarded, formatting it to meet the requirements, of the umbrella management system, and ultimately, forwarding the information to the umbrella management system.

BRIEF DESCRIPTION OF THE INVENTION

A method for conveying data communications network management information to an umbrella management system whereby network management information events are published on an information bus and received at a subscribing monitor interface located on the information bus. The monitor interface then converts the network management information events into umbrella management useable information and communicates that information to the umbrella management system. In this manner, the umbrella management system is able to import from an information bus-based network management system data pertaining to the devices and services that comprise the overall network.

In another aspect of the invention, a monitor interface comprises an adapter located on an information bus that subscribes to network management information events, a converter that formats the network management information events into data useable by the umbrella management system, and a forwarder that communicates the data to the umbrella management system. Additionally a filter may be implemented prior to conversion to separate out only the data required by the umbrella management system.

In another aspect of the invention, a data communications network comprises a network management application started on a host located at a network operation center. The network management application is in communication with network nodes and services through an adapter. Events are communicated between the management application, the node and the services by way of adapters. The publication and subscription of events provides for the exchange of useful network management data related to the nodes and services running on the nodes. A monitor interface that implements an adapter subscribes to specified events. A converter within the monitor interface converts the events to data that is useable by an umbrella management system. A forwarder within the monitor interface communicates the data to the umbrella management system.

DETAILED DESCRIPTION OF THE PRESENT INVENTION

Those of ordinary skill in the art will realize that the following description of the present invention is illustrative only and is not intended to be in any way limiting. Other embodiments of the invention will readily suggest themselves to such skilled persons from an examination of the within disclosure.

In accordance with a presently preferred embodiment of the present invention, the components, processes and/or data structures are implemented using interfaces and devices implementing C++ programs running on an Enterprise 2000™ server running Sun Solaris™ as its operating system. The Enterprise 2000™ server and Sun Solaris™ operating system are products available from Sun Microsystems, Inc of Mountain View, Calif. Different implementations may be used and may include other types of operating systems, computing platforms, computer programs, firmware and/or general purpose machines. In addition, those of ordinary skill in the art will readily recognize that the devices of a less general purpose nature, such as hardwired devices, devices relying on FPGA (Field Programmable Gate Array) or ASIC (Application Specific Integrated Circuit) technology, or the like, may also be used without departing from the scope and spirit of the inventive concepts herein disclosed.

Figure 2:
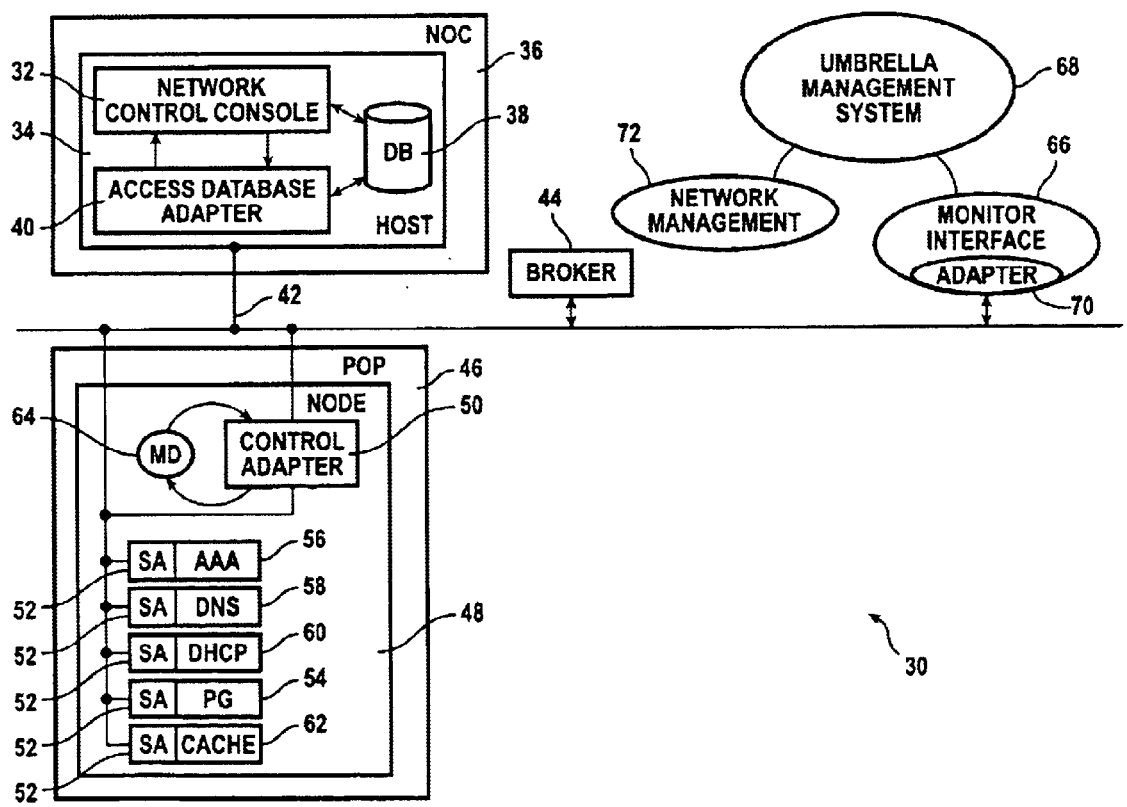
FIG. 2 is a schematic drawing of the integration of an information bus-based network management system with an umbrella management system, in accordance with a presently preferred embodiment in the present invention.

Referring to FIG. 2, a schematic diagram of data communications network 30 implementing the integration of an information bus-based network management system with an umbrella management system is shown in accordance with a presently preferred embodiment in the present invention. A network control console (NCC) 32 is physically located on a host 34 within a Network Operation Center (NOC) 36. The NCC 32 is an application program running on the host 34. The NCC 32 monitors and manages the information bus-based data network management system and serves as the communication interface between the data network management system and a systems administrator. A systems administrator is typically an individual employed by a network service provider who maintains a portion of the overall data communications network 30. The NCC 32 is in communication with a database 18 and an access database adapter 40.

Figure 1:
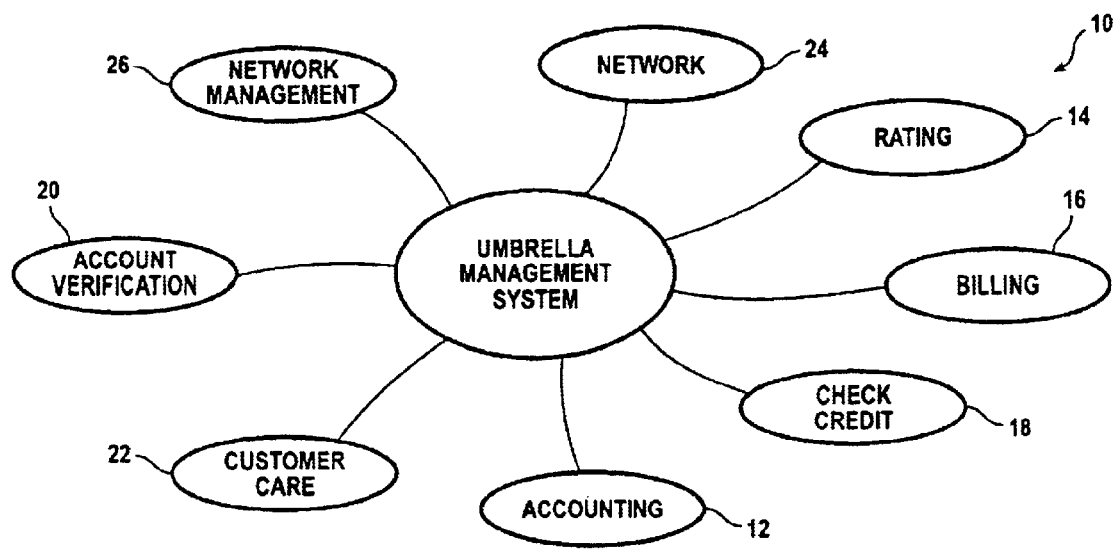
FIG. 1 is a schematic drawing of an umbrella management system, in accordance with the prior art.

The database 38 and access database adapter 40 can run on the same host 34 as the NCC 32, as depicted in FIG. 1, or the database 38 and the access database adapter 40 can be located on other remote devices. The database 38 stores information related to the various components and services comprising the information bus-based data communications network 10 being managed. The system administrator accesses the information in the database 38, as needed, in conjunction with the network control console 32 to perform the overall network management task. The access database adapter 40 is in communication with both the database 38 and the NCC 32. This adapter, and other adapters in the invention, provide bi-directional mapping of information between the NCC 32 and other services comprising the data communications network 10. Adapters, such as the access database adapter 40 subscribe to and publish events. An event is an independent entity that contains an unspecified amount of information pertinent to the occurrence of a specific circumstance or event occurring within a device or service. For example, the access database adapter 40 receives commands from the NCC 32 to publish an event. The information contained in the event may be found in the NCC's request or the access database adapter 40 may communicate with the database 38 to find the required information. The event is then published to other services and components within the data network management system across an information bus 42. A detailed discussion of the specific events published by the access database adapter 40 and subscribed to by the monitor adapter 70 of the monitor interface 66 is provided later in this disclosure.

The information bus 42 that serves as the transportation medium for a presently preferred embodiment of the present invention can be Common Object Request Broker Architecture (CORBA)-based. The CORBA-based information bus is capable of handling the communication of events to and from objects in a distributed, multi-platform environment. The concept of a CORBA-based information bus is well known to those of ordinary skill in the art. Other acceptable communication languages can be used as are known by those of ordinary skill in the art.

CORBA provides a standard way of executing program modules in a distributed environment. A broker, therefore, may be incorporated into an Object Request Broker (ORB) within a CORBA compliant network. To make a request of an ORB, a client may use a dynamic invocation interface (which is a standard interface which is independent of the target object's interface) or an Object Management Group Interface Definition Language (OMG IDL) stub (the specific stub depending on the interface of the target object). For some functions, the client may also directly interact with the ORB. The object is then invoked. When an invocation occurs, the ORB core arranges so a call is made to the appropriate method of the implementation. A parameter to that method specifies the object being invoked, which the method can use to locate the data for the object. When the method is complete, it returns, causing output parameters or exception results to be transmitted back to the client.

Figure 3:
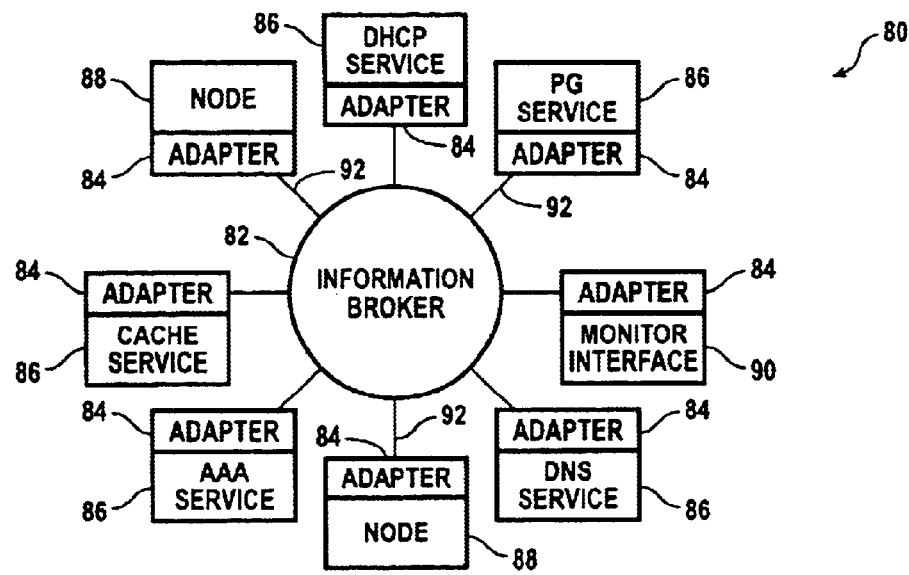
FIG. 3 is a schematic drawing of a Enterprise Application Integration (EAI) system highlighting the relationship between an information broker and adapters, in accordance with a presently preferred embodiment of the present invention.

In accordance with a presently preferred embodiment of the present invention an Enterprise Application Integration (EAI) system is used to broker the flow of information between the various services and adapters comprising the data networked management system of the present invention. The use of EAI systems in networked environments is well known by those of ordinary skill in the art. An example of an EAI system that can be incorporated in the presently preferred invention is the ActiveWorks Integration System; available from Active Software of Santa Clara, Calif. As shown in FIG. 3, such an EAI system 80 uses an information broker 82 as the hub of the system. The information broker 82 acts as the central control and storage point for the system. The information broker 82 can reside on a server and serves to mediate requests to and from networked clients; automatically queuing, filtering and routing events while guaranteeing delivery. The information broker 82 is capable of storing subscription information and using such subscription information to determine where published information is to be sent. Referring back to FIG. 2, the information broker 44 is shown located at a point along the information bus 42. In most instances the broker will be located within the same NOC 36 as the host 34 that runs the NCC 32 application. Another key feature to the EAI system 80 is the use of adapters 84 that allow users of the EAI system 80 to integrate diverse applications and other information when using the integration system. Adapters 84 provide bi-directional mapping of information between the application's native format and integration system events, enabling all custom and packaged applications, databases, and Internet and extranet applications to exchange information. As shown in FIG. 3 the adapters 84 run on the various services 86, network nodes 88 and the monitor interface 90 of the presently preferred embodiment of the present invention. These adapters 84 publish and subscribe to by way of the information bus 92 that has its hub at the broker 82.

Referring back to FIG. 2 the information bus 42 is in communication with a Point of Presence (POP) 46 within the data communications network 30. The PoP 46 is one of many PoPs that the information bus 42 is in communication with. Located within PoP 46 is a host or node 48. The node 48 is in communication with the information bus 42 through control adapter 50 and one or more service adapters 52 that are connected with the various services that are used on the node 48.

By way of example, the node 48 of FIG. 2 is configured with a protocol gateway service 54, an Authentication, Authorization and Accounting (AAA) service 56, a Domain Name System (DNS) service 58, a Dynamic Host Configuration Protocol (DHCP) service 60 and a cache service 62. Those of ordinary skill in the art will appreciate that the services shown are not intended to be limiting and that other services and other service configurations can be used without departing from the inventive concepts herein disclosed.

The protocol gateway service 54 is used to couple the network user to the data communications network. The protocol gateway service 54 functions as an interface that allows access requests received from a user to be serviced using components that may communicate using different protocols. A typical protocol gateway service 54 may be able to support different user access methodologies, such as dial-up, frame relay, leased lines, ATM (Asynchronous Transfer Mode), ADSL (Asymmetric Digital Subscriber Line) and the like.

Used in conjunction with the protocol gateway service 54, the AAA service 56 performs user authorization and user accounting functions. The AAA service 56 stores user profile information and tracks user usage. The profile information stored in the AAA service 56 is forwarded to the protocol gateway service 54 when a network user desires network access.

The DNS service 58 is used to return Internet Protocol (IP) addresses in response to domain names received from a client, a network access server (NAS) or other services associated with the NAS or client. By way of example, if DNS service 58 receives a domain name from a requesting service, it has the capability to locate the associated IP address from within the memory of the DNS service 58 (or another DNS service) and return this IP address to the requesting service 54. Alternately, DNS service 58 can be used to return domain names in response to IP addresses received from a client, a NAS or other services associated with the NAS or client. By way of example, if DNS service 58 receives an IP address from a requesting service, it has the capability to locate the associated domain name from within the memory of DNS service 58 or another DNS service) and return this domain name to the requesting service.

The DHCP service 60 is used as a dynamic way of assigning IP addresses to the network users.

The memory service 62 is a simple cache performing data storage functions.

Each of these services is in communication with a corresponding service adapter 52. The service adapter 52 subscribes to and publishes various events on the information bus 42. The service adapter 52 is configured so that it subscribes to events published by the access database adapter 40 of the NCC 32 and the control adapter 50 of the node 48. The service adapter 52 also publishes events to the access database adapter 40 of the NCC 32 and the control adapter 50 of node 48.

A control adapter 50 is located within node 48. A control adapter 50 preferably runs on all nodes that have services that are managed by the NCC 32. The control adapter 50 monitors the state and status of the node 48 and allows the system administrator to remotely start and stop services on the node 48. Additionally, the control adapter 50 serves to insure that the services within node 48 remain viable. The control adapter 50 subscribes to and publishes events on to the information bus 42 as a way of communicating with the adapters comprising the EAI system and the service administrator by way of the NCC 32. A detailed discussion of the events published by the control adapter 30 and subscribed to by the monitor adapter 70 is provided later in this discussion.

A master daemon 64 is in communication with the control adapter 50. The function of the master daemon is to insure that the control adapter 50 remains viable. The master daemon 64 starts the control adapter 60 initially and restarts the control adapter 30 if a failure occurs. In this sense, the master daemon 64 is defined as a parent process and the control adapter 50 is the child process of the master daemon 64. The master daemon 64 is an application that is kept extremely simple so as to minimize the likelihood that it will ever crash.

A monitor interface 66 is in communication with information bus 42 and an umbrella management system 68. The monitor interface 66 is an application running on a host (not shown in FIG. 2). The monitor interface 66 may be located at any point along information bus 42. Generally, monitor interface 66 will be located within the same NOC or PoP where the associated umbrella management system 68 is implemented. The monitor interface 66 implements monitor adapter 70 that is configured to subscribe to various events published on information bus 42 by access database adapter 40, control adapter 50 and service adapters 52. The events to which monitor adapter 70 subscribes are generally related to the specific information requested by umbrella management system 68 or applications within umbrella management system 68. Without the monitor interface 66 serving as a link between the information bus-based network management system and umbrella management system 68, the network management application 72 associated with umbrella management system 68 will not have the capability to access the information found in the events. Other applications (not shown in FIG. 2) within umbrella management system 68 may also benefit from information found within events subscribed to on information bus 42. Therefore, those skilled in the art will realize that monitor adapter 70 can be configured so as to subscribe to any event published on information bus 42 that will provide useful information to the applications associated with umbrella management system 68.

The following is an exemplary listing and definition of some of the events subscribed to by monitor adapter 70. These events are published by access database adapter 40, control adapter 50 and service adapters 52. This listing is by way of example and is not intended to be exhaustive or limiting in any way. It is possible and within the inventive concept herein disclosed for monitor adapter 70 to subscribe to any and all events described below. Additionally, other events not defined in this discussion are possible and can be used in this invention without departing from the inventive concepts herein disclosed.

The monitor adapter 70 can subscribe to "start events" published by access database adapter 40 of NCC 32. Start events cause control adapter 50 to start up a specific service or multiple services. The monitor adapter 70 subscribes to these events so that umbrella management system 68 can be supplied data related to what services have been started, what services are currently running and on what devices services are being implemented. Additionally, by having monitor adapter 70 subscribe to start events the umbrella management system is informed of additional instances of a given service being implemented on a device. An instance being defined as a single implementation of the service, it is possible for any one device to implement more than one instance of a given service in parallel. An example of the information contained within a start event includes the Global Unique Identifier (GUID) of the publisher, the GUID of the subscribing control adapter, the GUID of the service to be started, the service name and the absolute path where the service binary resides.

The monitor adapter 70 can subscribe to "stop events" published at the directive of NCC 32. Stop events cause control adapter 50 to shut down a specific instance of a service or multiple services. The monitor adapter 70 subscribes to these events so that umbrella management system 68 can be supplied data related to what services are no longer being implemented, what services may be available and what devices have been stopped. An example of information contained within a stop event includes the GUID of the publisher, the GUID of the subscribing control adapter, the GUID of the service to be stopped and the name of the service to be stopped.

The monitor adapter 70 can subscribe to "configure" events published by access database adapter 40 of NCC 32. Configure events are published to configure control adapter 50 or service adapters 52 upon initial start up of control adapter 50 or service adapters 52, or configure events can be published to modify a preexisting configuration. Additionally, a configure event can be published to configure monitor adapter 70 upon initial start up of monitor interface 66 or to modify a preexisting configuration. The control adapter 50, service adapters 52 and monitor adapter 70 update their corresponding configure files upon receiving a configure event. The monitor adapter 70 subscribes to these events so that the umbrella management system 68 can be supplied data related to how nodes and services are currently configured. An example of the information contained within a configure event includes the GUID of the publisher, the GUID of the subscriber, listening port configuration, sink port configuration, protocol handler information, engine data and facility data.

Additionally, the monitor adapter can subscribe to "exception" events published by control adapter 50 and service adapters 52. These events report the existence of an abnormal condition within node 48 or the service controlled by the corresponding service adapter 52. Each time that an exception condition exists the control adapter 50 or the service adapter 52 will publish an exception event. Exception events can be classified as either an error, a warning or information. When the exception event reports an error the error will have a security level associated with it. The severity level can include, minor, recoverable, severe, critical and unrecoverable. If the error condition reaches a severity level that causes node 48 to fail, then along with the exception event publication, master daemon 64 is activated and attempts to restart control adapter 50. If the error condition reaches a severity level that causes a service to fail, then along with the exception event publication control adapter 50 attempts to restart the service adapter 52. The monitor adapter 70 subscribes to these events so that umbrella management system 68 can be provided data related to abnormal conditions or errors occurring at nodes or services within the data communications network. An example of the information found in an exception event includes the GUID of the publisher, the classification of the exception (error, warning or info), the severity level if the classification is an error and a description of the exception condition.

The monitor adapter 70 can subscribe to "race" events that are published by control adapter 50. Race events report the occurrence of two or more conflicting events from two or more NCCs being received by a control adapter within a specified short period of time. This event reports the situation where two or more NCCs publish conflicting operation events (i.e., a start event and a stop event) to control adapter 50 instantaneously, or nearly instantaneously. The control adapter 50 will perform the events in the order they arrive, and then publish a race event. The time span for having conflicting events can either be configured in the configure event or by default the time span for a racing event is defined at 5 seconds. The monitor adapter 70 subscribes to these events so that umbrella management system 68 can be provided data related to conflicting conditions being sent to a service or device by two or more system administrators. An example of information contained within a race event includes the GUID of the publisher, the GUID of the NCCs, the nature of the conflict and a description message.

Figure 4:
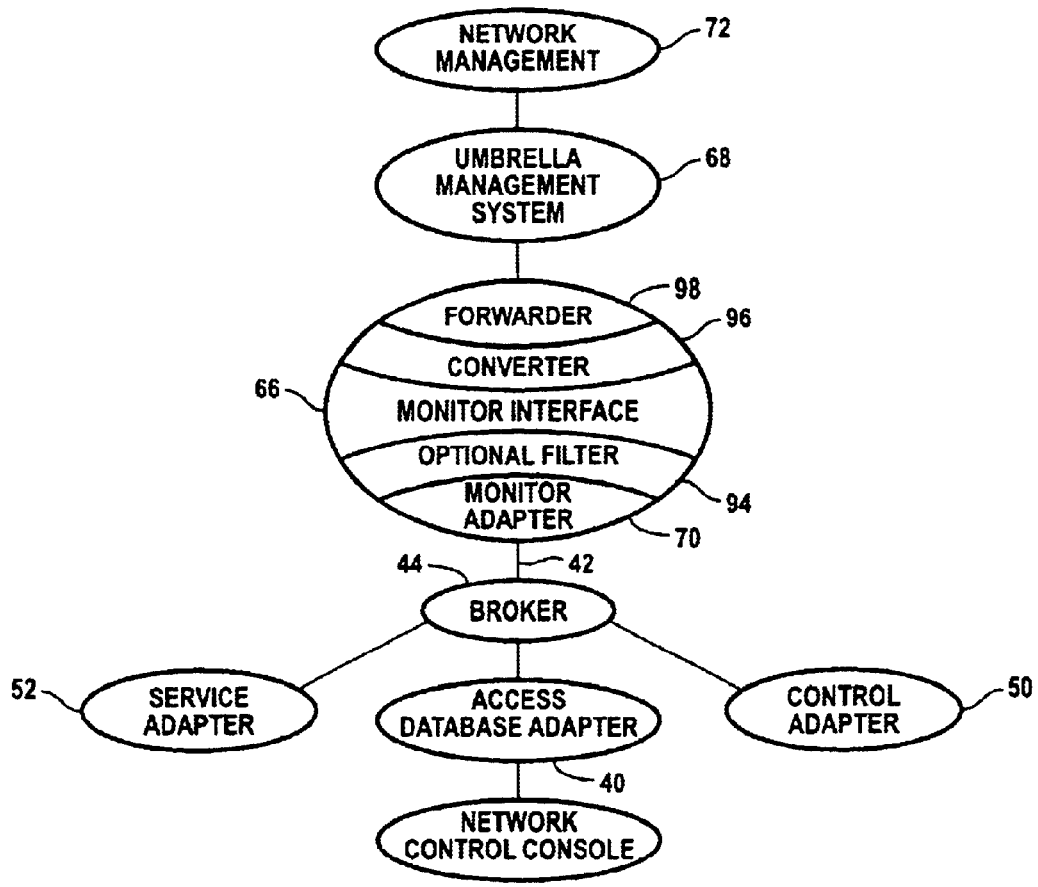
FIG. 4 is a schematic drawing of a monitor interface implementing an adapter in communication with an information bus and a converter in communication with an umbrella management system, in accordance with a presently preferred embodiment of the present invention.

In accordance with a presently preferred embodiment of the present invention, FIG. 4 is a system diagram of monitor interface 66 and the devices and applications through which the monitor interface communicates. The monitor interface 66 is comprised of monitor adapter 70 that is in communication with information bus 42. The monitor adapter 70 is capable of subscribing to various events published on information bus 42. Publishing is performed at service adapters 52, control adapter 50 and access database adapter 40. All events are mediated through the broker 44 that serves to proxy events to those that subscribe to them. Optionally, monitor interface 66, implements filter 94. The filter 94 is implemented to select specific umbrella management system pertinent information from the received events. The monitor interface 66 also implements converter 96 that reformats the information found in the events into data format that is acceptable to umbrella management system 68. Converter 96 receives the event information and translates or converts it into a format useable by the existing umbrella management system. Since existing umbrella management systems all have well-defined input protocols for receiving information, adapting the present invention for use with any particular umbrella management system is a straightforward task well within the ability of those of ordinary skill in the art and familiar with the input protocols for the particular umbrella management system. A forwarder 98 is implemented to convey the reformatted data to the umbrella management system 68. The monitor interface 66 forwards the reformatted data to the umbrella management system 68 that in turn communicates the data to network management application 72. The network management application as shown in FIG. 4, is by way of example of an application running on the umbrella management system 68 that desires event-related data. Other applications running on the umbrella management system 68 can also desire and use event-related data and are intended to be within the inventive concepts herein disclosed.

In another aspect of the present invention, a presently preferred embodiment implements monitor adapter 70 configured to publish events on to information bus 42. These events can be in response to published events received by the monitor adapter 66 or they may be configured from information communicated from umbrella management system 68. Generally, when monitor adapter 70 publishes events they will be subscribed to by access database adapter 40 used in conjunction with NCC 32.

Figure 5A:
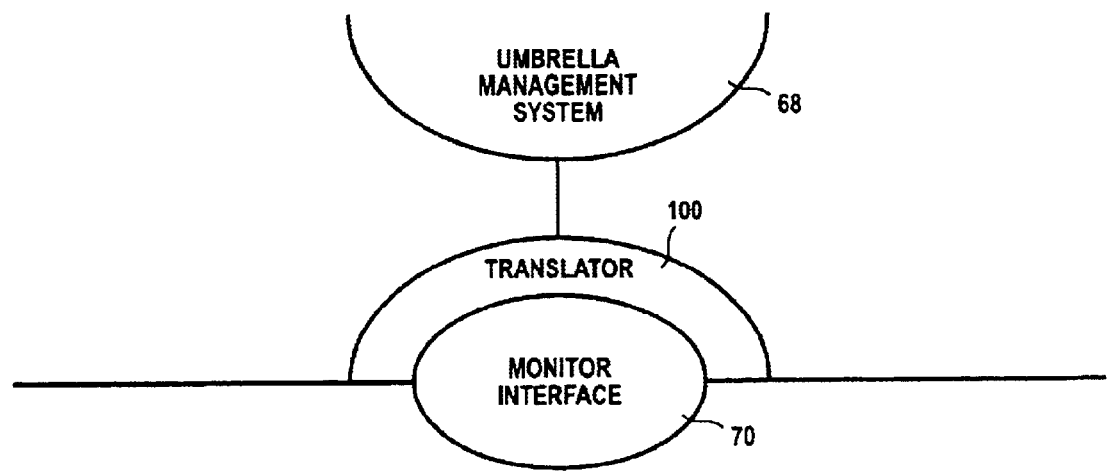
FIGS. 5A and 5B are schematic drawings of an umbrella management system in communication with a translator, in accordance with a presently preferred embodiment of the present invention.
Figure 5B:
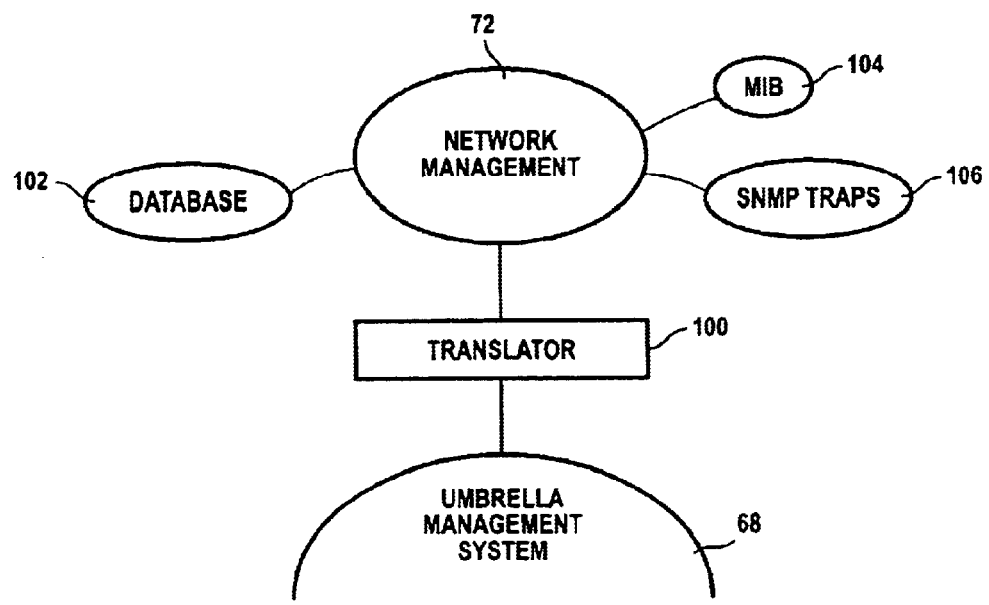

FIGS. 5A and 5B are schematic drawings illustrating the location in the communication flow where the conveyed network management data is translated into umbrella management system compatible data structures. FIG. 5A shows a translator 100 being implemented in parallel with the monitor interface 70. In this model the translation takes place shortly after the event data has been reformatted into umbrella management system-useable data. Once translated, the data is then forwarded to the umbrella management system 68. In FIG. 5B the translator 100 is being implemented directly prior to the data being communicated to the network management application 72. In this model, once the data is translated, the network management application 72 may direct the data to a database 102, a Management Information Base (MIB) 104, or send out Simple Network Management Protocol (SNMP) traps 106. A MIB is a defined database within a SNMP network management environment that contains a collection of objects managed by the SNMP. Objects are defined as variables that define the condition or state of a specific device or service within a network. SNMP traps are defined as reports sent to management stations that notify that a certain event has occurred. The use of MIBs and SNMP traps in data communications network management is well known by those of ordinary skill in the art.

Figure 6:
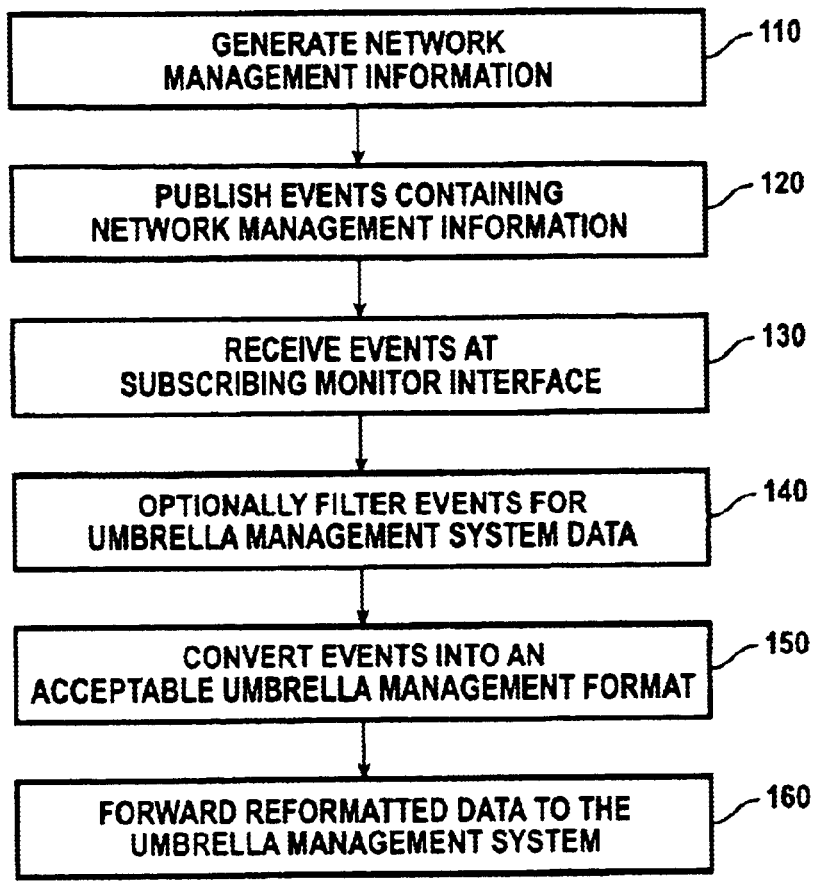
FIG. 6 is a flow diagram illustrating a method for conveying data communications network management data to an umbrella management system in accordance with a presently preferred embodiment of the present invention.

FIG. 6 is a flow diagram illustrating a method for conveying data communications network management information to an umbrella management system in accordance with a preferred embodiment of the present invention. At 110 network management information is generated by specific happenings or events at nodes and/or services throughout the data communications network. At 120 adapters throughout the data communications network publish on to an information bus the network management information as events. These events may include the starting of a service, the stopping of a service, the configuration of a node or service, an abnormal condition existing at a node or service, and/or a service receiving conflicting directives within a short period of time (i.e. a race condition). Other events are also possible. At 130 these events are subscribed to and received by a monitor interface that is in communication with the information bus and serves to prepare these events for integration into the umbrella management system. At optional 140 the events may be filtered so that only information contained within the events that is of interest to the umbrella management system receives further processing. At 150 the events are converted into a format that is useable by the umbrella management system. At 160 the converted data is communicated to the umbrella management system. The communication media can be any media acceptable within the constraints of the umbrella management systems. By way of example these media may include telephone lines, wireless communications, and the like.

Figure 7:
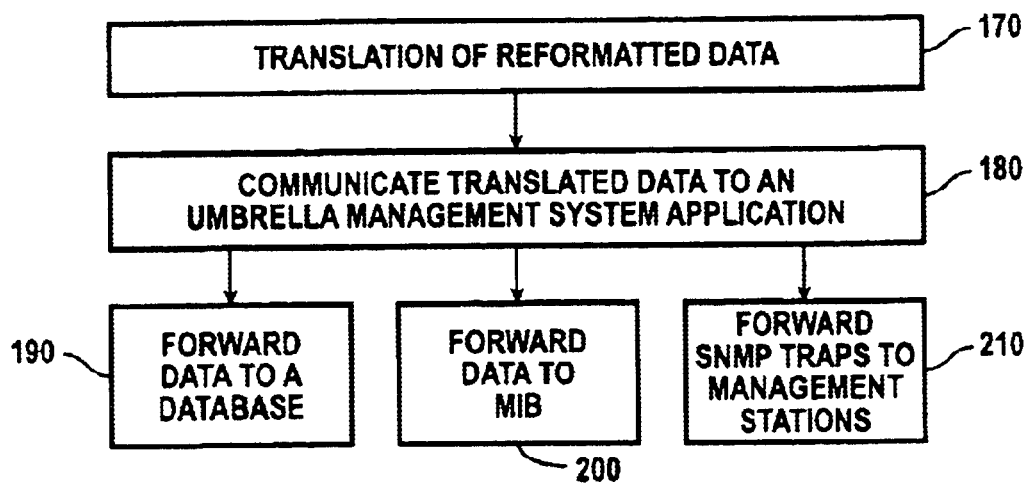
FIG. 7 is a flow diagram illustrating additional aspects of the method for conveying data communications network management data to an umbrella management system in accordance with a presently preferred embodiment of the present invention.

FIG. 7 is a flow diagram illustrating further methodology involved in the transmittance of data from the monitor interface to a specific application within the umbrella management system, in accordance with a presently preferred embodiment of the present invention. At 170 once the data is reformatted it undergoes a subsequent translation procedure that allows for the data to be structured so that the umbrella management application using the data has process capability. The translation step can be implemented in parallel with the reformatting process prior to the data being forwarded to the umbrella management system or the translation step can take place at any point after the reformatted data has been released to the umbrella management system. At 180 the translated data is communicated to an application process associated with the umbrella management system. At 190 the application can forward the translated data to a database within the application. Alternatively at 200 the translated data is communicated to a Management Information Base (MIB) within a network management application that stores all objects in the application. Alternatively at 210 the translated data is communicated to management stations throughout the network in the form of SNMP traps that report the occurrence of significant events.

Figure 8:
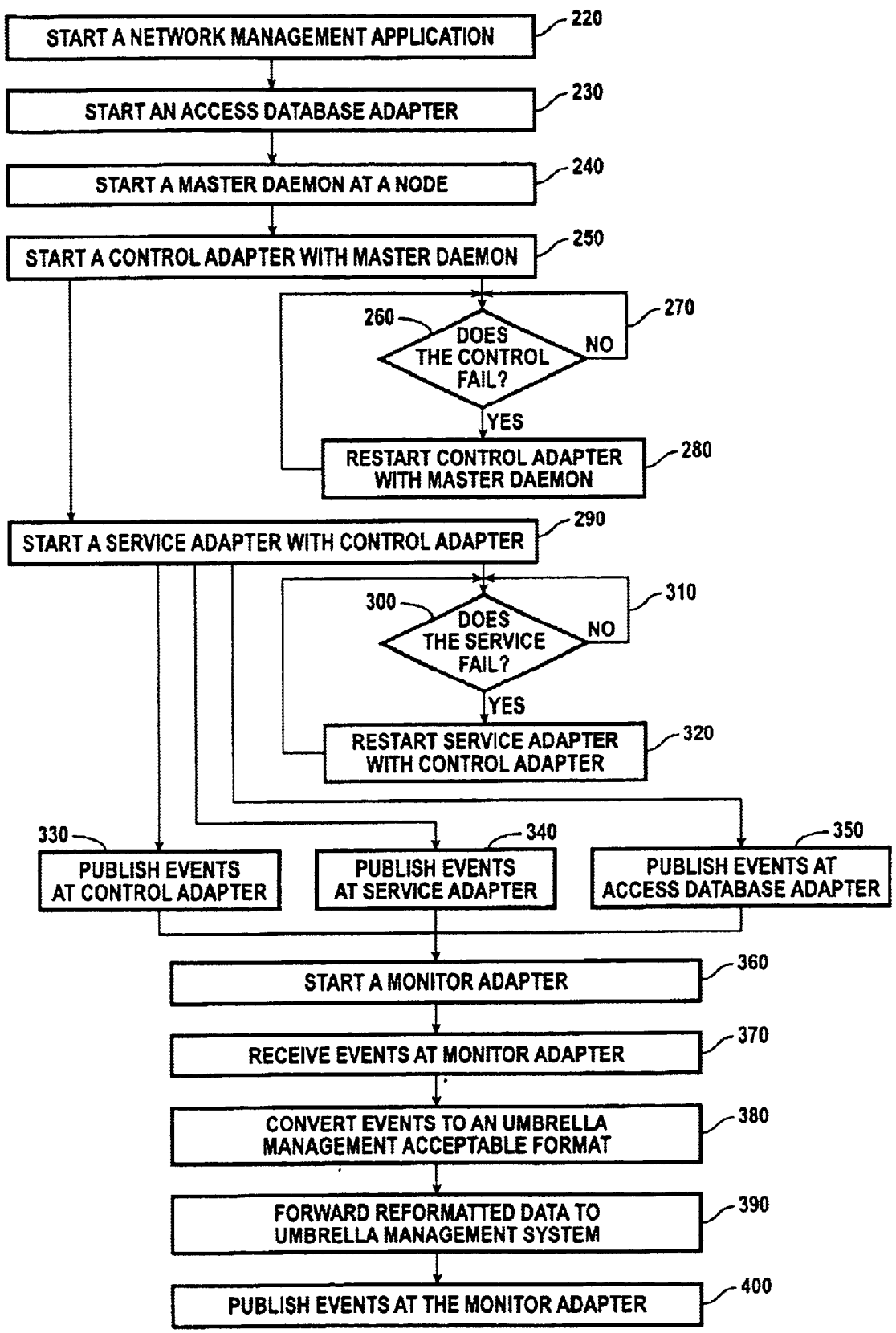
FIG. 8 is a flow diagram illustrating a method for management and maintenance of a data communications network, in accordance with a presently preferred embodiment of the present invention.

FIG. 8 is a flow chart diagram illustrating a method for managing a data communications network, in accordance with a presently preferred method of the present invention. At 220 a network management application is started on a host that may be located within a NOC. An example of a network management application is the network control console (NCC). At 230 an access database adapter that is in communication with the network management application is started. At 240 the master daemon is started. At 250 the control adapter is started by the master daemon executing a command to start the control adapter. Once the control adapter is started it is viewed as a child process controlled by the master daemon parent process. At 260 the master daemon is in constant standby mode waiting to re-start the control adapter should the control adapter fail. At 270 if the control adapter does not fail the master daemon continues monitoring the control adapter until a failure occurs. At 280 if the control adapter fails the master daemon restarts the control adapter.

At 290 the control adapter starts a service running on the node by activating the service adapter. The command for this start process may be found in the control adapter's database or it may come from a signal over the information bus. At 300 the control adapter is constantly polling the service adapter to insure that the service adapter is functional. At 310 if the service does not fail the control adapter continues polling the service adapter until a determination is made that the service has failed. At 320 if the results of the polling process determine that a service failure has occurred then the control adapter initiates an automatic restart process.

At 330 the control adapter sends out events over an information bus. These events, that are published by the control adapter, provide information to subscribing entities. At 340 the service adapter sends out events over the information bus. These events, that are published by the control adapter, provide information to subscribing entities. At 350 the access database adapter associated with the network management application sends out signals over the information bus. These signals, that are published by the access database adapter, provide information to subscribing entities.

At 360 a monitor adapter is started that is in communication with a monitor interface. At 370 the monitor adapter receives events published by the control adapter, service adapter and/or the access database adapter. At 380 the monitor interface converts the events into a format acceptable by the associated umbrella management system. At 390 the reformatted data is forwarded to the umbrella management system. At 400 the monitor adapter publishes events on the information bus based upon the need for response to events received or based upon information communicated from the umbrella management system.

Alternative Embodiments

Although illustrative presently preferred embodiments and applications of this invention are shown and described herein, many variations and modifications are possible which remain within the concept, scope and spirit of the invention, and these variations would become clear to those skilled in the art after perusal of this application. The invention, therefore, is not limited except in spirit of the appended claims.

What is claimed is:

1. A method for managing a data communications network comprising:
   starting a network management application program;
   starting an access database adapter in communication with said network management application program;
   starting a master daemon in communication with said access database adapter;
   starting a control adapter with said master daemon;
   monitoring said control adapter with said master daemon until said control adapter stops;
   restarting said control adapter with said master daemon should said control adapter ever stop;
   starting at least one service with said control adapter, said service including a service adapter in communication with said control adapter and said access database adapter; and
   starting a monitor interface adapter, said monitor interface adapter in communication with said control adapter, said service adapter, said access database adapter, and an umbrella management system.

2. A method in accordance with claim 1, further comprising:
   publishing at said control adapter, said service adapter and said access database adapter network management information events on to an information bus;
   subscribing at said monitor interface adapter to said network management information events;
   receiving said network management information events at said monitor interface adapter;
   converting said network management information events into umbrella management system information useable by said umbrella management system; and
   communicating said umbrella management system information to said umbrella management system.

3. A method in accordance with claim 2, further comprising:
   publishing events at said monitor interface adapter on to said information bus.

4. A data communications network comprising:
   a first processor including:
      a network management application,
      an access database adapter in communication with said network management application and an information bus, said access database adapter publishing events onto said information bus, and
      a database in communication with said network management application and said access database adapter; and
   a monitor interface in communication with said information bus and an umbrella management system, said monitor interface comprising:
      an adapter that subscribes to and captures network management events off of said information bus,
      a converter in communication with said adapter that formats said events into umbrella management system information, and
      a forwarder in communication with said converter that conveys said umbrella management system information to said umbrella management system.

5. The data communications network as defined in claim 4, wherein said monitor interface further comprises:
   a filter in communication with said adapter, said filter selecting certain information from certain network management events.

6. The data communications network as defined in claim 4, wherein said monitor interface further comprises:
   a publisher in communication with said adapter, said publisher transmitting events across said information bus.

7. A data communications network comprising:
   a first processor including:
      a network management application,
      an access database adapter in communication with said network management application and an information bus, said access database adapter publishing events onto the information bus, and a database in communication with said network management application and said access database adapter;

a second processor including:
  a control adapter in communication with said information bus, said control adapter publishing events onto the information bus,
  a service adapter in communication with said information bus and said control adapter, said service adapter started by said control adapter service, said service adapter publishing events onto the information bus, and
  at least one service running on said second processor, said service in communication with said service adapter; and a monitor interface including:
  a monitor interface adapter in communication with said information bus, said monitor interface adapter subscribing to and capturing events published by said access database adapter, said control adapter, and said service adapter,
  a converter in communication with said monitor interface adapter, said converter converting said events into umbrella management system information, and
  a forwarder in communication with said converter, said forwarder conveying said network management information to an umbrella management system.

8. A program storage device readable by a machine tangibly embodying a program of instructions executable by the machine to perform a method for managing a data communications network, the method comprising:

starting a network management application program;

starting an access database adapter in communication with said network management application program;

starting a master daemon in communication with said access database adapter;

starting a control adapter with said master daemon;

monitoring said control adapter with said master daemon until said control adapter stops;

restarting said control adapter with said master daemon should said control adapter ever stop;

starting at least one service with said control adapter, said service including a service adapter in communication with said control adapter and said access database adapter; and starting a monitor interface adapter, said monitor interface in communication with said control adapter, said service adapter, said access database adapter, and an umbrella management system.

9. A method in accordance with claim 1, wherein said master daemon is defined as a parent process and said control adapter is defined as a child process of the master daemon.

10. The method of claim 9, further comprising:

selecting certain information from certain network management events, said filter in communication with said adapter.

11. The method of claim 9, further comprising:

transmitting events across said information bus by a publisher in communication with said adapter.

12. The method of claim 11, further comprising:

filtering said network management information events to communicate selected information in said events to said umbrella management system.

13. A data communications network comprising:

a first processor means including:
  a network management application module running on said first processor means, and
  means, in communication with said network management application module and an information bus, for publishing events onto said information bus; and a second processor means including:
  a monitor interface module running on said second processor means, said monitor interface module in communication with said information bus and an umbrella management system, said monitor interface comprising:
    means for subscribing to and capturing network management events off of said information bus, and
    means, in communication with said means for subscribing, for converting said network management events into umbrella management system formatted information.

14. The data communications network as defined in claim 13, wherein said monitor interface module further comprises:

means, in communication with said means for converting, for forwarding said umbrella management system formatted information to said umbrella management system.

15. The data communications network as defined in claim 13, wherein said monitor interface module further comprises:

means, in communication with said means for subscribing and capturing, for filtering certain information from certain network management events.

16. The data communications network as defined in claim 13, wherein said monitor interface module further comprises:

means, in communication with said means for subscribing and capturing, for publishing events across said information bus.

* * * * *

UNITED STATES PATENT AND TRADEMARK OFFICE
CERTIFICATE OF CORRECTION

PATENT NO. : 6,871,224 B1
DATED : March 22, 2005
INVENTOR(S) : Chu et al.

It is certified that error appears in the above-identified patent and that said Letters Patent is hereby corrected as shown below:

<u>Column 4,</u>
Line 24, replace "18" with -- 38 --.

<u>Column 5,</u>
Line 50, after "These adapters 84 publish and subscribe to", insert -- information --.

<u>Column 8,</u>
Line 8, replace "GU1ID" with -- GUID --.

Signed and Sealed this

Thirteenth Day of September, 2005

JON W. DUDAS
*Director of the United States Patent and Trademark Office*